United States Patent [19]

Oppenlaender et al.

[11] Patent Number: 5,053,154

[45] Date of Patent: Oct. 1, 1991

[54] USE OF ADDUCTS OF 1,2-BUTYLENE OXIDE WITH H-AZIDIC ORGANIC COMPOUNDS AS LUBRICANTS, AND LUBRICANTS CONTAINING THESE ADDUCTS

[76] Inventors: Knut Oppenlaender, 23 Otto-Dill-Strasse, 6700 Ludwigshafen; Roland Schwen, 7 Im Schlossgarten, 6701 Friedelsheim; Richard Baur, 1 Nelkenstrasse, 6704 Mutterstadt; Charalampos Gousetis, 98 Carl-Bosch-Strasse, 6700 Ludwigshafen; Juergen Mohr, 48 Hochgewanne, 6718 Gruenstadt; Helmut Mach, 5 Dantestrasse, 6900 Heidelberg, all of Fed. Rep. of Germany

[21] Appl. No.: 449,010

[22] Filed: Dec. 12, 1989

[30] Foreign Application Priority Data

Dec. 29, 1988 [DE] Fed. Rep. of Germany ....... 3844222

[51] Int. Cl.$^5$ .......................................... C10M 133/00
[52] U.S. Cl. ................................................. 252/51.5 R
[58] Field of Search ........................... 252/51.5 R, 52; 568/614; 564/504, 505

[56] References Cited

U.S. PATENT DOCUMENTS

| | | | |
|---|---|---|---|
| 3,829,505 | 8/1974 | Herold | 252/50 |
| 3,919,093 | 11/1975 | Davis et al. | 252/31 |
| 4,701,520 | 10/1987 | Irving | 528/412 |
| 4,707,535 | 11/1987 | Koleshe | 528/412 |

FOREIGN PATENT DOCUMENTS

| | | |
|---|---|---|
| 651607 | 12/1964 | Belgium . |
| 0109515 | 5/1984 | European Pat. Off. . |
| 0110003 | 6/1984 | European Pat. Off. . |
| 1017951 | 1/1966 | United Kingdom . |

*Primary Examiner*—Jacqueline V. Howard

[57] ABSTRACT

Adducts of 1,2-butylene oxide with H-azidic organic compounds are used as lubricants, and lubricants contain these adducts.

6 Claims, No Drawings

USE OF ADDUCTS OF 1,2-BUTYLENE OXIDE WITH H-AZIDIC ORGANIC COMPOUNDS AS LUBRICANTS, AND LUBRICANTS CONTAINING THESE ADDUCTS

The present invention relates to the use of adducts of 1,2-butylene oxide with H-azidic organic compounds as lubricants, and lubricants containing these adducts.

Modern lubricants can no longer be prepared using mineral oil components alone. Synthetic components have to be admixed since the properties of the lubricants have to meet steadily increasing requirements.

Polyalkylene glycols based on ethylene oxide and/or propylene oxide have long been known as lubricants and have been launched on the market. However, polyglycols based on ethylene oxide have insufficiently low temperature stability as lubricants. On the other hand, polyglycols which have been developed as copolymers based on ethylene oxide/propylene oxide exhibit good viscosity and temperature behavior. The ethylene/propylene copolymers, like the pure ethylene oxide adducts, are generally still water-soluble. Pure propylene oxide adducts have also been launched on the market as polyalkylene glycols. Although the pure polypropylene glycols are not water-soluble, they have, like the water-soluble polyethylene glycols and polyethylene/propylene glycols, the decisive disadvantage that they are not completely miscible with mineral oils at low temperatures.

It is an object of the present invention to provide lubricants which have improved low temperature properties and, together with mineral oils, possess improved low temperature tolerance up to high viscosities.

We have found that this object is achieved by a method for using lubricants, in which adducts of 1,2-butylene oxide with H-azidic organic compounds are employed as lubricants.

The present invention also relates to a lubricant containing an adduct of 1,2-butylene oxide with an H-azidic organic compound.

Preferred H-azidic organic compounds on which the adducts to be used according to the invention are based are alcohols and primary and secondary amines.

Examples of suitable alcohols are secondary and, preferably, primary alcohols of the general formula $R_1$—OH, where $R_1$ is alkyl of 1 to 36, preferably 4 to 24, in particular 6 to 20, carbon atoms. Examples of suitable alcohols are methanol, ethanol, propanol, butanol, pentanol, hexanol, octanol, decyl alcohol, lauryl alcohol, isotridecanol, myristyl alcohol, cetyl alcohol and stearyl alcohol.

The adducts, to be used according to the invention, of 1,2-butylene oxide with alcohols are advantageously prepared by reacting an alcohol, as an initiator, with 1,2-butylene oxide in the presence of an alkali, such as sodium hydroxide solution, potassium hydroxide solution, sodium methylate, potassium methylate or another alkali metal alkoxylate, such as a sodium or potassium alkoxylate of an aliphatic alcohol of 2 to 5 carbon atoms, for example sodium tert-butylate or potassium tert-butylate, preferably potassium hydroxide solution, at from 120° to 160° C., preferably from 130° to 150° C., in particular from 140° to 150° C., to give the adduct. The molar ratio of 1,2-butylene oxide to the initiator alcohol is in general from 500:1 to 1:1, preferably from 400:1 to 5:1, in particular from 300:1 to 10:1.

For example, primary amines of the general formula $R_2$—$NH_2$ and, preferably, secondary amines of the general formula $R_2$—NH—$R_3$, where $R_2$ and $R_3$ are identical or different and are each alkyl of 1 to 30, preferably 4 to 24, in particular 6 to 20, carbon atoms, are suitable for the preparation of the adducts of 1,2-butylene oxide with amines. Examples of suitable amines are methylamine, dimethylamine, ethylamine, diethylamine, propylamine, dipropylamine, butylamine, dibutylamine, hexylamine, dihexylamine, octylamine, dioctylamine, decylamine, didecylamine, laurylamine, dilaurylamine, isotridecylamine, diisotridecylamine, myristylamine, dimyristylamine, cetylamine, dicetylamine, stearylamine and distearylamine.

The adducts, to be used according to the invention, of 1,2-butylene oxide with amines are advantageously prepared by reacting an amine, as an initiator, with 1,2-butylene oxide in the presence of an alkali, such as sodium hydroxide solution, potassium hydroxide solution, sodium methylate, potassium methylate or another alkali metal alkoxylate, such as a sodium or potassium alkoxylate of an aliphatic alcohol of 2 to 5 carbon atoms, for example sodium tert-butylate or potassium tert-butylate, preferably potassium hydroxide solution, at from 120° to 160° C., preferably from 130° to 150° C., in particular from 140° to 150° C., to give the adduct. The molar ratio of 1,2-butylene oxide to the initiator amine is in general from 500:1 to 1:1, preferably from 400:1 to 5:1, in particular from 300:1 to 10:1.

The adducts of 1,2-butylene oxide with amines can also be obtained by first reacting the 1,2-butylene oxide with the amine in a molar ratio of from about 1:2 to 1:1 at, as a rule, from 60° to 160° C., preferably from 100° to 160° C., in the absence of the alkali to give the corresponding $\beta$-alkylaminoalkanol or $\beta$-dialkylaminoalkanol, which is then reacted, in a second stage, with further 1,2-butylene oxide in the presence of an alkali, for example from 0.1 to 3% strength by weight sodium hydroxide solution or, preferably, potassium hydroxide solution, to give the poly-1,2-butylene oxide adduct.

It was surprising that 1,2-butylene oxide could be reacted with an alkali in a simple manner to give the lubricants to be used according to the invention, since U.S. Pat. No. 3,829,505, column 2, lines 26-28, discloses that 1,2-butylene oxide cannot be reacted with alcohols in the presence of KOH to give relatively high molecular weight adducts.

The novel lubricants contain one or more adducts of 1,2-butylene oxide with an H-azidic organic compound. The lubricant may also contain other components, for example conventional components, such as base oils based on mineral oil or other synthetic lubricant components, for example poly-$\alpha$-olefins. The adducts to be used according to the invention may be employed individually or as a mixture with one another.

The said lubricants are used, for example, for gears of automobile engines, automotive gears with manual shift and automatic gears or as industrial lubricants.

Lubricants having high viscosities, for example ISO-VG values (kinematic viscosity at 40° C. in $mm^2 s^{-1}$) of 1,500, can be obtained with the adducts, to be used according to the invention, of 1,2-butylene oxide with, for example, alcohols. This is surprising since it is only possible to obtain lubricants having ISO-VG values of not more than 460 with corresponding adducts of propylene oxide with alcohols.

The adducts, to be used according to the invention, of 1,2-butylene oxide with amines give lubricants which furthermore have substantially higher heat stability.

The Examples which follow illustrate the invention.

a) Examples of preparation

1. Preparation of the adducts of 1,2-butylene oxide with alcohols

A dehydrated mixture of the alcohol used as the initiator and KOH is initially taken in a pressure vessel, the amount of KOH used being about 0.01–1, preferably 0.05–0.5, e.g. 0.1, % by weight of the expected total weight of the reaction product. The vessel is flushed several times with nitrogen and heated to 140–150° C., after which the 1,2-butylene oxide is fed in continuously or batchwise with stirring, at constant temperature and under from 5 to 30 bar, via a dip tube or onto the surface, until the desired viscosity is reached. Volatile constituents are removed, advantageously under reduced pressure, and, if necessary, the product is clarified by filtration.

2. Preparation of the adducts of 1,2-butylene oxide with amines

The amine, as an initiator, is initially taken together with 5% by weight, based on the amine, of water in a pressure vessel. The vessel is flushed several times with nitrogen and heated to 140–150° C., and 1,2-butylene oxide in, for example, a 10 mol % excess, is fed in while stirring. Primary amines are dialkoxylated. After the end of the reaction, volatile constituents and water are completely removed under reduced pressure.

The β-aminoalkyl alcohols thus obtained are then reacted with further 1,2-butylene oxide to give the poly-1,2-butylene oxide adducts, as described in Preparation Example 1.

3. The following 1,2-butylene oxide adducts were obtained according to Preparation Examples 1 and 2:

|   | Product | Viscosity at | | | |
|---|---|---|---|---|---|
|   |   | −20° C. | +40° C. | +100° C. | VI |
| A | 1,2-Butylene oxide with isotridecanol | 38000 | 225 | 27 | 154 |
| B | 1,2-Butylene oxide with isotridecylamine | 54000 | 210 | 22 | 126 |
| C | 1,2-Butylene oxide | 52000 | 230 | 25 | 138 |

-continued

|   | Product | Viscosity at | | | |
|---|---|---|---|---|---|
|   |   | −20° C. | +40° C. | +100° C. | VI |
|   | with diisotridecylamine |   |   |   |   |
| D | 1,2-Butylene oxide with isotridecanol | 314000 | 1500 | 160 | 225 | b) Investigation into the aging behavior

1. Aging behavior at 150° C. under air in the absence of metal

| Product from 3. | Test time in days | Weight loss % | Viscosity loss at | | pH after end of test | Flashpoint °C. |
|---|---|---|---|---|---|---|
|   |   |   | 40° C. | 100° C. |   |   |
| A | 9 | 22 | −64% | −63% | 3 | 185 |
| B | 65 | 20 | −21% | −24% | 5 | 238 |
| C | 49 | 20 | −6% | −17% | 4 | 248 |

2. Aging behavior at 150° C. under air in the presence of the metals iron and copper

| Product from 3. | Test time in days | Weight loss % | Viscosity loss at | | pH after end of test | Flashpoint °C. |
|---|---|---|---|---|---|---|
|   |   |   | 40° C. | 100° C. |   |   |
| A | 9 | 22 | −61% | −61% | 3 | 186 |
| B | 28 | 20 | −27% | −32% | 4 | 217 |
| C | 21 | 20 | −18% | −28% | 4 | 230 |

We claim:

1. A method of lubricating a surface which comprises, applying to the surface a lubricating amount of an adduct of 1,2-butylene oxide with a primary or secondary aliphatic amine having 1–30 carbon atoms.

2. A method as defined in claim 1, wherein the adduct is the sole lubricant.

3. A method as defined in claim 1, wherein the adduct is applied in combination with a base oil comprising a mineral oil.

4. A method as defined in claim 1, wherein the adduct is an adduct of 1,2-butylene oxide with a secondary aliphatic amine having 1–30 carbon atoms.

5. A lubricant comprising a lubricating effective amount of an adduct of 1,2-butylene oxide with a primary or secondary aliphatic amine having 1–30 carbon atoms.

6. A lubricant as defined in claim 5, comprising the adduct and a base oil comprising a mineral oil.

* * * * *

UNITED STATES PATENT AND TRADEMARK OFFICE
CERTIFICATE OF CORRECTION

PATENT NO. : 5,053,154

DATED : Oct 1, 1991

INVENTOR(S) : Oppenlaender et al.

It is certified that error appears in the above-identified patent and that said Letters Patent is hereby corrected as shown below:

ON THE TITLE PAGE:

Between "Primary Examiner-Jaqueline V. Howard" and "ABSTRACT"

insert --Attorney, Agent , or Firm - Keil & Weinkauf--.

Signed and Sealed this

Twenty-first Day of June, 1994

Attest:

BRUCE LEHMAN

*Attesting Officer*  *Commissioner of Patents and Trademarks*